June 15, 1954     W. H. DIETZ     2,681,059
HERNIA TRUSS PAD, SUPPORTER, AND MASSAGER
Filed Oct. 31, 1952
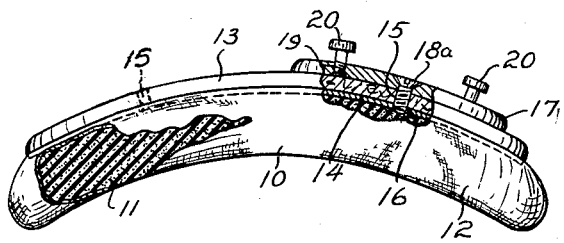
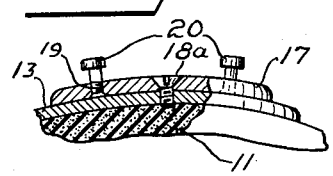
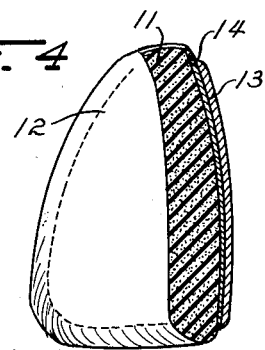
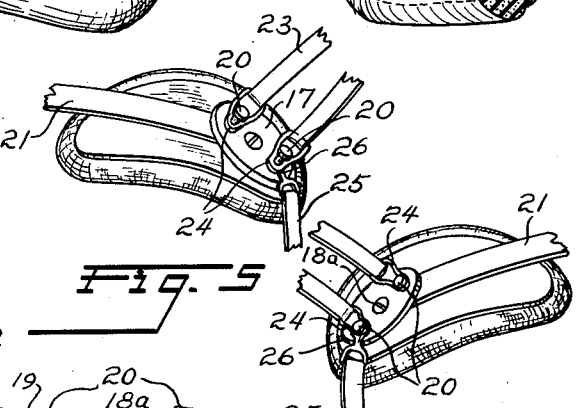
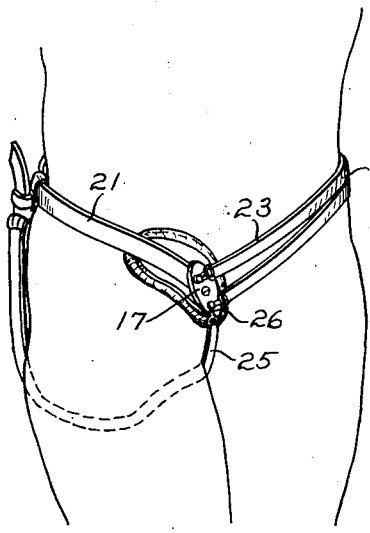
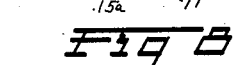
INVENTOR
WILLIAM H. DIETZ
BY Jones & Young
AGENTS Patented June 15, 1954

2,681,059

UNITED STATES PATENT OFFICE 2,681,059

HERNIA TRUSS PAD, SUPPORTER, AND MASSAGER

William H. Dietz, Pittsburgh, Pa.

Application October 31, 1952, Serial No. 317,955

7 Claims. (Cl. 128—100)

The present invention relates to a pad construction and more particularly to a truss pad construction for the relief and treatment of groin rupture.

Groin rupture, or more properly, inguinal hernia, is in simple language, the protrusion of the bowel through a cavity or rupture located in the abdominal wall of body, usually in the groin. Such an injury ordinarily occurs as a result of some abnormal strain imparted to the abdominal wall occasioned, for example, by the lifting of heavy objects. Such abnormal strains quite often result in a rupture of the abdominal wall thus causing groin rupture.

Injuries of this kind are often painful and materially limit the type of employment that a person can obtain. For example, no heavy work requiring any lifting or stretching can be performed. In other words, no work which would require any stretching or straining of the abdominal wall is permitted without danger of aggravating the injury.

For many years, there have been a wide variety of devices known as truss pads manufactured and sold whose function is to provide some type of support for the abdominal wall as well as prevent any protrusion of the bowel through the abdominal rupture. One such form of truss pad, widely marketed, is the one known as the ball or plug type. This type of pad is based on the principle of a plug in that it tends to plug the rupture opening in a manner similar to that of a cork in a bottle. The objection to a truss pad of this structure is that the abdominal wall is very flexible. Therefore in the daily habits of a person possessing a rupture considerable flexing of the abdominal wall will occur. As a result, positive seating of the pad within the rupture opening is not possible. Moreover, as time goes by, the continual wearing of a truss pad of this type will result in a further enlargement of the rupture opening forming a sac. A further disadvantage with pads of this type is that occasionally the pad pad will slip slightly or the bowel will slip by the pad. When this occurs strangulation is possible and an immediate operation is usually necessary. Other similar types of truss pads have likewise possessed these or additional disadvantages.

In order to provide a truss pad that will satisfactorily perform its intended purpose as well as aid in the healing of the rupture the pad must perform several vital functions. A satisfactory truss pad must positively seal the rupture opening without causing any enlargement of the opening. In other words, the lips of the opening should be maintained together at all times when the truss pad is worn. This will result not only in a positive closing of the opening but will tend to join the tissues and promote the healing of the abdominal wall with a corresponding healing of the rupture. Moreover, the truss pad must be of such construction as to provide means to massage and exercise the abdominal muscle adjacent the rupture to effect a "toning" thereof. This will further aid in the healing of the injury.

It is therefore the principal object of the invention to provide a truss pad of new and novel construction which will perform the required function of such a device.

Another object of the present invention is to provide a truss pad which will positively close the rupture opening yet without any enlargement of the hernial opening.

A still further object is to provide a truss pad that will maintain the lips of the rupture opening in close engagement to aid in the ultimate healing of the injury.

Yet another object is to provide a truss pad that will retain the opening in closed position and at the same time massage and tone the surrounding abdominal muscles to aid in the healing of the injury.

And a still further object is to provide a truss pad that can be worn at all times and will permit the wearer to perform heavy tasks requiring the lifting of heavy objects without any discomfort or possibility of the protrusion of the bowel through the ruptured opening. Similarly, the truss pad may be worn after a hernia operation as a precautionary method to prevent its re-occurrence while engaged in heavy work.

Another object of this invention is to provide a truss pad designed in such a manner that it may be worn on either the right or left side of the body by simply changing the location of the belt securing hooks to which the pad is attached.

Another object of this invention is to provide a truss pad which is of efficient construction, easily adjustable and is relatively inexpensive to manufacture but at the same time will function in a superior manner for the purpose for which it is intended.

Other and additional objects and advantages will be manifest from the following description taken in conjunction with the annexed drawing.

To the accomplishment of the foregoing and related ends, the present invention then consists of the means hereinafter fully described and particularly pointed out in the claims, the annexed drawing and the following description setting forth in detail certain means in the carrying out of the invention, such disclosed means illustrating, however, but one of various ways in which the principle of the invention may be employed.

The present invention is illustrated, by way of example, in the accompanying drawing in which:

Fig. 1 is a side elevation partly in section of the truss pad showing its curvature along its longitudinal axis.

Fig. 2 is a perspective view of the truss pad of present invention showing the top or outer side.

Fig. 3 is a perspective view showing the truss pad in position on one side of the body.

Fig. 4 is a transverse sectional view of onehalf of the truss pad shown in Fig. 2 showing the lateral curvature of the pad.

Fig. 5 is a top view showing the truss securing element in place for the right side of the body.

Fig. 6 is a top view of the pad showing the truss securing element in place for the left side of the body.

Fig. 7 is a fragmentary side elevation partly in section of the form of the truss pad construction illustrating the use only of a top plate of metal; and Fig. 8 is a fragmentary cross-section of a form of the invention in which the top plate is non-metallic and requiring no metallic backing plate.

Referring now to the drawing in detail, and with particular reference to Figures 1 and 2, an illustrative embodiment of one form of the improved truss pad of the present invention, generally designated by reference numeral 10, is shown. The truss pad 10 comprises a thick, flexible body section 11 of generally kidney shaped configuration. The body section 11 is concaved in its curvature along its longitudinal axis in order to permit the pad to more snugly fit the curvature of the groin or other parts of the abdominal wall where the injury is present.

The pad section 11 is made from cellular, elastic material such as foam rubber which material has been found to possess the desired degree of resiliency without lateral expansion from its normal perimeter when used in the present invention. However, the pad section 11 is not intended to be limited to this particular material since other compositions which may possess these desirable characteristics of flexibility without lateral deformation can be employed. Moreover, the pad section 11 should have its outer perimeter edge rounded so as to effect a rolling action with the abdominal wall when the truss pad is in use.

For prevention of wear to the pad section 11 itself, a cover 12 of any suitable material such as, for example, cloth, chamois, or plastic fabric may be employed. This prevents any moisture or the like from being absorbed by the cellular portion of the pad section 11 when the pad is used. Further, the cover aids in preventing ultimate possible deformation of the pad section 11.

A top plate 13 of generally kidney shaped configuration and similarly concave along its longitudinal axis is secured to the top face of the pad section 11. Plate 13 is smaller in circumference than the pad section 11 for the purpose of providing a beaded top edge to the pad section 11. In other words, by having the plate 13 smaller than the pad section 11, and when tightly secured to the pad section 11, the outer top perimetral edge of pad section 11 will be rolled inwardly to form a beaded edge. By this construction the truss pad 10 when in use will definitely cause a rolling of the edge against the abdominal muscles to effect or aid in healing thereof. Moreover, this arrangement will permit a compression of the plate 13 inwardly without any lateral deformation of the pad section 11.

The plate 13 may be formed from any relatively rigid somewhat flexible material such as, for example, molded fibre board and thin spring steel or metal. If fibre board is the material employed in the manufacture of the plate 13 (as shown) a backing plate 14 must be interposed between the plate 13 and the pad section 11 in order to permit the attachment of the truss pad 10 to a truss belt.

In the illustrative embodiment shown, the plate 13 is provided with openings 15 on either side of the plate 13. The purpose of placing the openings 15 on either side of the plate 13 is to permit the use of the formed truss pad 10 on either the left or the right side of the body merely by inserting a truss belt connecting plate to pad 10 at the desired openings 15. In other words, the truss pad of the present invention is convertible for either left side or right side use. Backing plate 14 is positioned between the top plate 13 and the pad section 11. The backing plate 14 is provided with threaded openings 16 which are in vertical alignment with the openings 15.

A belt holding plate 17 is positioned on the desired side of the top plate 13. The belt holding plate 17 is provided with a central opening 18 which will be in normal vertical alignment with openings 15 and 16 in the plate 13 and the backing plate 14. A threaded screw or central stud 18a extends through openings 15, 16 and 18 to secure their respective elements in tight engagement. Belt holding plate 17 is provided with threaded openings 19 on either side thereof for the purpose of receiving threaded studs 20 to which the belt 21 will be secured.

In the foregoing description, as hereinbefore stated, when the top plate 13 is made of fibre board, the backing plate 14 is necessary since it would be impossible to provide a threaded opening in the fibre board. However, it is obvious that a small threaded collar 15a could be provided in the openings 15 in the plate 13 to achieve the same result obtained with the backing plate 14 as shown in Fig. 8. However, if the plate 13 is made of metal obviously no backing plate will be necessary since the openings 15 present therein can be threaded to receive the screw 18a as shown in Fig. 7.

Referring now to Figs. 3, 5 and 6, wherein the truss pad 10 of the present invention is shown in use, the truss belt 21 comprises a belt 22 secured at one end to the screw 18a connecting the truss belt holding plate 19. The opposite end of the belt 22 has divided portions 23 carrying hooks 24 for connection with studs 20 in detachable relationship. A strap 25 carrying a hook 26 is secured to one of the studs 20 in detachable relationship. The strap 25 extends beneath the leg of the user and up over the buttocks and is connected to the belt 22 by means of any suitable clasp. This will result in the truss pad 10 being positioned properly over the hernia.

With the pad 10 in position in the manner just described, the muscles surrounding the hernia will be constantly toned while the lips of the hernial opening are in engagement. This action results in a gradual healing of the opening. Moreover, the truss pad 10 will prevent any enlargement of the opening and permit the wearer to perform his normal duties without fear of aggravating the injury.

Having described my invention, I claim as follows:

1. A truss pad comprising a kidney shaped body portion of a cellular, elastic material, said body portion being concave along its longitudinal axis, a top plate of the same general configuration as said body portion and secured thereto, said top plate being smaller in circumference than said body portion to form a rolled edge around the perimeter of said body portion, and means secured to said top plate for connecting said truss pad to a truss belt.

2. A truss pad in accordance with claim 1 wherein the kidney shaped body portion is made from cellular rubber.

3. A truss pad in accordance with claim 1 wherein the kidney shaped body portion is provided with a covering.

4. A truss pad in accordance with claim 1 wherein the connecting means comprises a plate detachably secured to said top plate.

5. A truss pad in accordance with claim 1 wherein the top plate is made from fibre board having a metal backing plate secured to its inner surface, said top plate and said backing plate provided with aligned openings.

6. A truss pad in accordance with claim 1 wherein the top plate is made of metal, said top plate being provided with a threaded opening on at least one side of the top plate therein to receive the means secured to the top plate for connecting the truss pad to a truss belt.

7. A truss assembly comprising a kidney shaped body portion made of cellular rubber, said body portion being concave along its longitudinal axis, a top plate of the same general configuration as said body portion and secured thereto, said top plate having a smaller circumference than said body portion to effect a rolled perimetral edge around the body portion, a stud secured to said top plate, a pair of studs positioned on either side of said central stud, a belt secured at one end to said central stud, the opposite end of said belt being divided into two strips for detachable engagement with said pair of studs, and a connecting strap connected at one end to one of said studs and to said belt at its opposite end thereof.

References Cited in the file of this patent

UNITED STATES PATENTS

| Number | Name | Date |
|---|---|---|
| 2,625,931 | Phillips | Jan. 20, 1953 |

FOREIGN PATENTS

| Number | Country | Date |
|---|---|---|
| 531,919 | France | Nov. 3, 1921 |
| 611,497 | France | July 10, 1926 |